United States Patent Office  
3,847,920  
Patented Nov. 12, 1974

3,847,920  
3-SUBSTITUTED PYRIMIDO[4,5-b]INDOLES  
Sylvester Klutchko, Hackettstown, and Max von Strandtmann, Rockaway Township, N.J., assignors to Warner-Lambert Company, Morris Plains, N.J.  
No Drawing. Filed May 17, 1973, Ser. No. 361,365  
Int. Cl. C07d 51/42  
U.S. Cl. 260—256.4 F  9 Claims

ABSTRACT OF THE DISCLOSURE

3-Substituted pyrimido[4,5-b]indoles having the formulas:

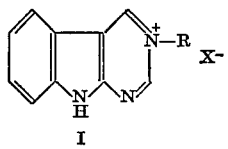 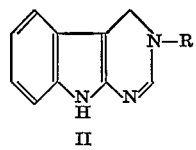

are disclosed. In the formulas, R is alkyl, aryl, dialkylaminoalkyl, hydroxyalkyl, O− (N-oxide), carboxymethyl or carboxymethyl anion and X is halogen or nonexistent in the case of the zwitterions. These compounds inhibit gastric secretions and are useful in treating gastric ulcers resulting from gastric hyperacidity.

---

The present invention relates to novel 3-substituted pyrimido[4,5-b]indoles having the formulas:

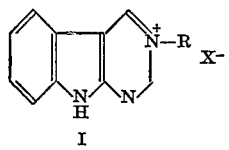 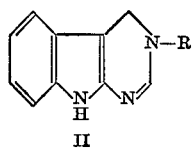

wherein R is alkyl, aryl, dialkylaminoalkyl, hydroxyalkyl, O− (N-oxide), carboxymethyl or carboxymethyl anion and X is halogen or nonexistent in the case of the zwitterions.

In the above definition for R, "alkyl" and the "alkyl" portions of dialkylaminoalkyl and hydroxyalkyl is meant to be straight or branched aliphatic hydrocarbons having 1 to 7 carbon atoms. It includes, for example, methyl, ethyl, propyl, isopropyl, butyl, isobutyl and the like. The term "aryl" denotes a monocyclic aromatic hydrocarbon, preferably of 6 to 10 carbon atoms, such as, for example, phenyl, tolyl and the like.

The compounds of this invention are useful in treating conditions resulting from gastric hyperacidity, for example, gastric ulcer in mammals.

These compounds, when tested by the procedure described by Shay et al., Gastroenterology 5, 43 (1945), are effective in preventing gastric ulcer formation in rats at a dose in the range of about 10 mg./kg. to 50 mg./kg. orally and preferably at 20 mg./kg. orally in mammals.

To treat gastric hyperacidity, for example, the above dosage level is prescribed, i.e., 10 mg./kg. to 50 mg./kg. orally two or three times daily. This dosage regimen may be varied depending on the sex, weight and the severity of the condition being treated, by methods well known to the healing arts.

In order to use these compounds, they are formulated with excipients such as lactose, calcium phosphate and the like into oral dosage forms such as tablets by known pharmaceutical technology.

According to the present invention, Compound I is prepared by treating 2-aminoindole of the formula A,

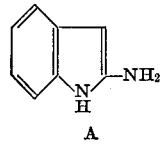

A with a Vilsmeier reagent such as phosphorous oxychloride and dimethylformamide at about 50° C. to obtain intermediates of the formulas B and C,

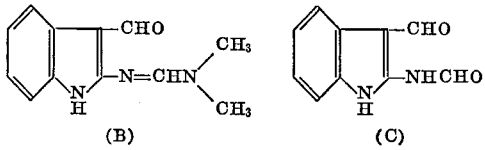

(B)  (C)

treating either intermediate B or C with an amine (RNH$_2$) or hydroxylamine as their hydrogen halide salts in a suitable solvent such as dimethylformamide at 130–150° C. gives Compound I.

The starting Compound A is disclosed in Pschorr, et al. Ber. 43, 2543 (1910).

Compound II, in turn, is obtained by reducing Compound I utilizing reducing agents such as with a complex metal hydride, typically potassium or sodium borohydride.

In order to further illustrate the practice of this invention, the following examples are included. The temperature used therein is in Centigrade and the abbreviation "ca." stands for "about."

EXAMPLE 1

N'-(3-Formylindol-2-yl)-N,N-dimethylformamidine

A quantity of 65.2 g. (0.42 mol) of phosphorous oxychloride was added slowly to 200 ml. of DMF with stirring, keeping the temperature at 50° with mild cooling. After ca. 5 minutes, at ca. 45°, a quantity of 33.6 g. (0.2 mol) of 2-aminoindole hydrochloride was added portionwise over several minutes, keeping the temperature at ca. 70° with mild cooling. The dark solution was then heated to 95° for 5 minutes and the hot solution was added to 1 l. of water containing ice chips. After several minutes the solution (at 25° C.) was treated with 10 M KOH, allowing the temperature to reach 40° (and using ice chips to prevent the temperature from exceeding 40°). Crystals separated while the mixture was still acid. Continued adding the KOH until strongly basic. The nature of the solid changed. The pasty solid was filtered, washed well with water and triturated for 5 minutes with hot 2-propanol. The cooled mixture was filtered and the product washed with 2-propanol and then ether; wt. 34 g. (79%), orange solid; m.p. 248–250°. Recrystallization from 2-propanol gave pure product; m.p. 250–252°.

Analysis.—Calcd for C$_{12}$H$_{13}$N$_3$O: C, 66.95; H, 6.09; N, 1952. Found: C, 66.73; H, 6.18; N, 19.69.

EXAMPLE 2

N-(3-Formylindol-2-yl)formamide

A quantity of 61.0 g. (0.4 mol) of phosphorous oxychloride was added gradually to 125 ml. of dimethylformamide with stirring and mild cooling, keeping the temperature at ca. 50°. After complete addition the solution was cooled to 40° and 21.8 g. (0.13 mol) of 2-aminoindole hydrochloride was added over a period of several minutes, allowing the temperature to rise to 90°. The solution was then heated to 100° for 5 minutes, cooled and added to 500 g. of chipped ice. Enough 10 M potassium hydroxide was added to completely precipitate an orange solid with the mixture still at acid pH. Additional ice chips were added as needed to keep temperature below 15°. The thick acidic slurry was filtered and washed with 200 ml. of ice water. The wet filtercake was heated with 300 ml. of 2-propanol on the steam bath. All solid dissolved near the boiling point and after several minutes crystals began to separate. After 15 minutes at reflux the mixture was cooled, filtered and the filtercake was washed with water (100 ml.) and 2-propanol to give 19.1 g. (78.3%) of product; m.p. 256–258° (dec). Recrystallization from dimethylformamide gave pure product; m.p. 262–264° (dec).

*Analysis.*—Calcd. for $C_{10}H_8N_2O_2$: C, 63.82; H, 4.29; N, 14.89. Found: C, 63.75; H, 4.37; N, 14.62.

EXAMPLE 3

9H-Pyrimido[4,5-b]indole 3-Oxide Hemihydrate

Method A.—A mixture of 9.1 g. (0.05 mol) of N-(3-formylindol-2-yl)formamide, 10.4 g. (0.15 mol) of hydroxylamine hydrochloride and 100 ml. of dimethylformamide was heated with stirring to 80°. All solid went into solution and after a minute, orange solid began to separate. The mixture was maintained at 100° for 5 minutes, cooled and treated with 200 ml. of ether to precipitate additional crude material. After decantation of the organic phase, water (50 ml.) was added and the separated solid was filtered, washed efficiently with 50 ml. cold water and dried to give 10.0 g. of crude tacky 3-oxide. Recrystallization from 400 ml. of hot water gave 5.6 g. (57.8%) of the product, isolated as a hemihydrate; m.p. 288–290° (dec).

*Analysis.*—Calcd for $C_{10}H_7N_3O \cdot \frac{1}{2}H_2O$: C, 61.89; H, 4.15; N, 21.65. Found: C, 61.74; H, 4.25; N, 21.95.

Method B.—A solution of 0.35 g. (0.005 mol) of hydroxylamine hydrochloride in 2.5 ml. of water was added to a hot solution of 0.5 g. (0.0025 mol) of N'-(3-formylindol-2-yl) - N,N - dimethylformamidine in 70 ml. of 2-propanol. The 2-propanol was distilled off at atmospheric pressure over a period of 20 minutes. Water (10 ml.) was added to the tacky residue. The separated solid was filtered, washed with cold water and dried to give 0.4 g. (86%) of product; m.p. 286–288° (dec).

EXAMPLE 4

3-(Carboxymethyl)-9H-pyrimido[4,5-b]indolium Hydroxide, Inner Salt Hydrate

A mixture of 15.0 g. (0.07 mol) of N'-(3-formylindol-2-yl) - N,N - dimethylformamidine, 35 g. (0.28 mol) of glycine methylester hydrochloride, 50 ml. of water and 700 ml. of 2-propanol was heated to the boiling point to effect solution. Most of the 2-propanol was distilled off over a period of one hour to a volume of 150 ml. The solution was cooled and the separated glycine methyl ester hydrochloride was filtered. The filtrate was treated with 800 ml. of 50% ether-petroleum ether to precipitate the tacky crude, orange 3 - (carbomethoxymethyl) - 9H-pyrimido[4,5-b]indolium chloride. Hydrolysis was effected by heating a solution of the ester and 400 ml. of 12% hydrochloric acid at 95° for 5 minutes. The separated crystals weighed 15.3 g. (78%) of 3 - (carboxymethyl)- 9H - pyrimido[4,5-b]indolium chloride; m.p. 272–274°.

Conversion to inner salt.—A quantity of 10.0 g. of above 3 - (carboxymethyl) - 9H - pyrimido[4,5-b]indolium chloride was dissolved in 600 ml. of hot 2% sodium bicarbonate solution. Excess glacial acetic acid was added until complete precipitation of product, isolated as a hydrate; wt. 6.4 g.; m.p. 249–251° (dec).

*Analysis.*—Calcd for $C_{12}H_9N_3O_2 \cdot H_2O$: C, 58.77; H, 4.52; N, 17.13. Found: C, 58.68; H, 4.58; N, 16.90.

EXAMPLE 5

3-Ethyl-9H-pyrimido[4,5-b]indolium Chloride

A solution of 15.1 g. (0.08 mol) of N-(3-formylindol-2-yl)formamide, 250 ml. of dimethylformamide and 7.83 g. (0.096 mol) of ethylamine hydrochloride (20% excess) was heated at 145° for one hour. The cooled solution was added to 1 l. of ether to precipitate 20 g. of crude material. Recrystallization from 300 ml. of hot water gave 14.8 g. (79.2%) of pure quaternary salt; m.p. 233–235°.

*Analysis.*—Calcd for $C_{10}H_7N_3 \cdot C_2H_5Cl$: C, 61.67; H, 5.18; N, 17.98; Cl, 15.17. Found: C, 61.44; H, 5.30; N, 17.75; Cl, 15.04.

EXAMPLE 6

3-Phenyl-9H-pyrimido[4,5-b]indolium Chloride

A mixture of 9.4 g. (0.05 mol) of N-(3-formylindol-2-yl)formamide, 7.7 g. (0.06 mol) of aniline hydrochloride and 200 ml. of dimethylformamide was heated to reflux. The resulting solution was maintained at reflux for one half hour, cooled and added to 1 l. of ether to precipitate a tacky product. After decantation the residue was triturated with ether (200 ml.). The ether was decanted and the residue was dissolved in 200 ml. of hot 2-propanol. On cooling, crystals separated; wt. 9.5 g. (62%); m.p. 250–260°. Recrystallization from ethanol-ether gave pure product melting at 263–265°.

*Analysis.*—Calcd for $C_{10}H_7N_3 \cdot C_6H_5Cl$: C, 68.21; H, 4.29; N, 14.91. Found: C, 67.99; H, 4.37; N, 15.14.

EXAMPLE 7

3-[2-(Dimethylamino)ethyl]-9H-pyrimido[4,5-b]indolium Chloride Hydrochloride A solution of 8.0 g. (0.043 mol) of N - (3 - formylindol - 2 - yl) formamide, 75 ml. of dimethylformamide and 7.4 g. (0.084 mol) of N,N-dimethylethylenediamine was treated with hydrogen chloride gas at a moderate rate for 30 seconds. The temperature rose to 70°. The solution was heated at 150° for 20 minutes. The cooled solution was treated with 100 ml. of ether to precipitate tacky material. On standing, partial crystallization resulted. The ether phase was decanted and the residue was triturated with 20 ml. of 2-propanol and the separated solid was filtered and washed with 2-propanol; wt. 3.6 g. (27.1%); m.p. 285–290°. Recrystallization from methanol-ether gave pure product; m.p. 294–296°.

*Analysis.*—Calcd for $C_{14}H_{17}N_4Cl \cdot HCl$: C, 53.68; H, 5.79; N, 17.89; Cl, 22.64. Found: C, 53.68; H, 5.90; N, 17.93; Cl, 22.36.

EXAMPLE 8

3-(3-Hydroxypropyl)-9H-pyrimido[4,5-b]indolium Bromide

A solution of 6.6 g. (0.035 mol) of N - (3 - formylindol-2-yl)formamide, 150 ml. of dimethylformamide and 3.15 g. (0.042 mol) of 3-amino-1-propanol was treated for a brief period (30 seconds) with hydrogen bromide gas. The solution was heated at reflux for 10 minutes, cooled and treated with ether until turbid. The separated crystals were filtered and washed with ether to give 3.1 g. (38%) of crude product; m.p. 235–240°. Recrystallization was effected by dissolution in 45 ml. of hot methanol, filtration and addition of ether to the filtrate to give 1.7 g. of pure, violet crystals; m.p. 244–246°.

*Analysis.*—Calcd for $C_{10}H_7N_3 \cdot C_3H_7OBr$: C, 50.67; H, 4.58; N, 13.63. Found: C, 50.57; H, 4.73; N, 13.47.

EXAMPLE 9

3,4-Dihydro-9H-pyrimido[4,5-b]indole-3-acetic acid

A quantity of 3.24 g. (0.06 mol) of potassium borohydride was added to a solution of 15.6 g. (0.06 mol) of 3-(carboxymethyl) - 9H - pyrimido[4,5-b]-indolium chloride in 300 ml. of 1 N sodium hydroxide. Some solid separated. It was heated to 40° to dissolve all solid. The stirred solution was cooled to room temperature and glacial acetic acid (15 ml.) was added dropwise until complete precipitation of a crude yellow solid; wt. 11.4 g. Purification was effected by dissolution of the crude solid in 500 ml. of 0.5 N NaOH, charcoal treatment, filtration and acidification with acetic acid to give 8.0 g. (58.2%) of pure product; m.p. 236–238° (dec).

*Analysis.*—Calcd for $C_{12}H_{11}N_3O_2$: C, 62.87; H, 4.84; N, 18.33. Found: C, 62.72; H, 5.00; N, 18.28.

EXAMPLE 10

3-Ethyl-3,4-dihydro-9H-pyrimido[4,5-b]indole

A solution of 10.5 g. (0.045 mol) of 3 - ethyl - 9H-pyrimido[4,5-b]indolium chloride in 400 ml. of water at 30° was treated portionwise with a total of 2.42 g. (0.045 mol) of potassium borohydride over a period of three minutes with stirring. Pale yellow solid separated as the mixture foamed. After 15 minutes the solid was filtered, washed well with water and dried to give 5.7 g. (65%) of product; m.p. 183–188°. Recrystallization from 2-propanol gave pure base; m.p. 180–200°.

*Analysis.*—Calcd for $C_{12}H_{13}N_3$: C, 72.34; H, 6.58; N, 21.09. Found: C, 72.24; H, 6.75; N, 21.07.

EXAMPLE 11

2-Aminoindole-3-carboxaldehyde

A solution of 9.0 g. (0.0478 mol) of N - (3 - formyl-indol - 2 - yl)formamide in 250 ml. of 1 N NaOH was heated to the boiling point for one minute. The cooled solution was treated with glacial acetic acid to pH 7.5. The separated crystals were filtered, washed with water and dried; wt. 4.8 g. (60%); m.p. 173–175°. The solutions of this compound are sensitive to air and/or light, turning blue in color. Recrystallization from ethylacetate gave pure product; m.p. 174–176°.

*Analysis.*—Calcd for $C_9H_8N_2O$: C, 67.48; H, 5.03; N, 17.49. Found: C, 67.71; H, 5.32; N, 17.66.

We claim:

1. A member selected from the group consisting of compounds of the formulas:

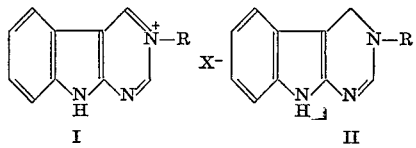

wherein R is a member selected from the group consisting of alkyl, dialkylaminoalkyl, monohydroxyalkyl in which alkyl has 1 to 7 carbon atoms, phenyl, alkylphenyl having a total of 7 to 10 carbon atoms, N-oxide, carboxymethyl, carboxymethyl anion, and X is chloro or bromo or nonexistent in the case of zwitterions.

2. A compound according to Claim 1 which is 9H-pyrimido[4,5-b]indole 3-oxide hemihydrate.

3. A compound according to Claim 1 which is 3-(carboxymethyl) - 9H - pyrimido[4,5-b]indolium hydroxide, inner salt hydrate.

4. A compound according to Claim 1 which is 3-ethyl-9H-pyrimido[4,5-b] indolium chloride.

5. A compound according to Claim 1 which is 3-phenyl-9H-pyrimido[4,5-b]indolium chloride.

6. A compound according to Claim 1 which is 3-[2-(dimethylamino)ethyl] - 9H - pyrimido[4,5-b]indolium chloride hydrochloride.

7. A compound according to Claim 1 which is 3-(3-hydroxypropyl) - 9H - pyrimido[4,5-b]indolium bromide.

8. A compound according to Claim 1 which is 3,4-dihydro - 9H - pyrimido[4,5-b]indole-3-acetic acid.

9. A compound according to Claim 1 which is 3-ethyl-3,4-dihydro-9H-pyrimido[4,5-b]indole.

References Cited

UNITED STATES PATENTS 3,414,574  12/1968  Frey, et al. _____ 260—256.4 F

DONALD G. DAUS, Primary Examiner

J. H. TURNIPSEED, Assistant Examiner

U.S. Cl. X.R.

260—326.13 R, 326.14 R, 326.15; 424—251